United States Patent [19]
Dunne et al.

[11] Patent Number: 5,949,529
[45] Date of Patent: *Sep. 7, 1999

[54] MODULARIZED LASER-BASED SURVEY SYSTEM

[75] Inventors: Jeremy G. Dunne, Littleton; Blair J. Zykan, Englewood, both of Colo.

[73] Assignee: Laser Technology, Inc., Englewood, Colo.

[*] Notice: This patent is subject to a terminal disclaimer.

[21] Appl. No.: 09/181,360

[22] Filed: Oct. 28, 1998

Related U.S. Application Data

[63] Continuation of application No. 08/918,395, Aug. 26, 1997, Pat. No. 5,859,693.

[51] Int. Cl.⁶ .................................................. G01C 3/08
[52] U.S. Cl. ........................................ 356/4.01; 33/1 CC
[58] Field of Search ............................... 356/4.01, 141.2, 356/147; 33/1 CC

[56] References Cited

U.S. PATENT DOCUMENTS

| | | | |
|---|---|---|---|
| 4,302,885 | 12/1981 | Levine et al. | 33/228 |
| 4,949,089 | 8/1990 | Ruszkowski, Jr. | 342/52 |
| 5,313,409 | 5/1994 | Wiklund et al. | 364/556 |
| 5,471,218 | 11/1995 | Talbot et al. | 342/357 |
| 5,574,552 | 11/1996 | Dunne | 356/5.05 |
| 5,612,779 | 3/1997 | Dunne | 356/5.01 |
| 5,652,651 | 7/1997 | Dunne | 356/5.01 |
| 5,739,785 | 4/1998 | Allison et al. | 342/357 |
| 5,859,693 | 1/1999 | Dunne et al. | 356/4.01 |

OTHER PUBLICATIONS

Criterion Series Advertisement, Hand Held Survey Lasers, Laser Technology, Inc.
Impulse and Impulse XL Advertisements, Laser Technology, Inc.
SharpShot 2000 Advertisement, Laser Technology, Inc.
Generation II Surveyor Advertisement, MDL Technologies LLC., Professional Surveyor, Apr. 1997, vol. 17, No. 3.

*Primary Examiner*—Mark Hellner
*Attorney, Agent, or Firm*—William J. Kubida; John R. Wahl; Holland & Hart LLP

[57] ABSTRACT

A modular laser-based surveying system is disclosed which comprises a laser-based distance measuring module and a separable compass module removably coupled to the laser based distance measuring module. Each of these modules may be operated as stand alone units as each has its own power supply and display. The system further may comprise a separate angle encoder module adapted to be coupled to either the laser distance measuring module or the compass module and a data logger or computer for processing data transmitted from any or all of the modules.

11 Claims, 5 Drawing Sheets

MODULARIZED LASER-BASED SURVEY SYSTEM

CROSS REFERENCE TO RELATED APPLICATIONS

This application is a continuation of U.S. patent application Ser. No. 08/918,395 filed Aug. 26, 1997, now U.S. Pat. No. 5,859,693 which is incorporated herein by reference in its entirety.

This application is also related to U.S. Pat. Nos. 5,574,552, entitled "Self Calibrating Precision Timing Circuit And Method for a Laser Range Finder"; 5,652,651, entitled "Laser Range Finder Having Selectable Target Acquisition Characteristics and Range Measuring Precision"; and 5,612,779, entitled "Noise Threshold determining Circuit and Method for A Laser Range Finder", and U.S. patent application Ser. No. 08/926,598, entitled "Compact Laser-Based Distance Measuring Apparatus", filed on Aug. 21, 1997 and assigned to the assignee of the present invention, Laser Technology, Inc., pending Englewood, Colo., the disclosures of which are hereby specifically incorporated herein by this reference.

BACKGROUND OF THE INVENTION

1. Field of the Invention

This invention relates generally to the field of surveying equipment and more particularly to a laser based distance measuring system.

2. Description of the Related Art

A conventional laser based surveying apparatus developed and currently marketed by Laser Technologies, Inc. of Englewood, Colo. is the Criterion™ series of surveying instruments. The Criterion™ instrument includes, in one housing, a laser transmitter and receiver, a microprocessor, a numeric keypad for data entry and instrument control commands, an internal flux gate compass for bearing/azimuth measurement, a tilt angle sensor for inclination measurements, an aiming or spotting telescope mounted on the housing, a data collector, and serial port for data transfer. This instrument measures and computes heights, horizontal distances, vertical distances, slope distances, inclinations, coordinates, bearings or azimuths, and multiple point traverse survey data. The instrument may also be coupled to a global positioning system (GPS) receiver to pinpoint the location from which measurements are being taken.

The Criterion™ instrument utilizes an external battery pack which typically may be worn on the user's belt or back. The battery pack preferably should be kept at least 12 inches away from the instrument itself to prevent magnetic interference from the battery pack from distorting the internal flux gate compass sensor readings. In addition, the internal location of the compass in the Criterion had to be chosen to be as remote as possible from the unit's circuit boards to minimize the effect of internal circulating electrical currents during system operation on the readings from the flux gate compass.

Conventional laser based survey instruments such as the Criterion, which has an internally mounted flux gate compass, are limited in the inclinations for which azimuth readings may accurately be made. This is because the flux gate compass must be held within ±15 degrees of level in order to generate an accurate azimuth signal. This ±15 degree requirement is imposed because the core of the compass is a floating ring which must remain fairly level, i.e., within the 15 degree range. In addition, accuracy decreases as one approaches this 15 degree limit. Thus, for most accurate readings, the Criterion instrument must be held as horizontal as possible.

However, many measurement situations arise where the inclination is greater than 15 degrees. In these cases, two separate measurements must be taken, one horizontally for azimuth, and then the instrument repositioned, for inclination or slope distance measurement. Repositioning often leads to variation in the resultant readings because of the separate measurements required and the opportunity to introduce errors.

Another conventional surveying system is marketed by MDL Technologies L.L.C. This system consists of a laser rangefinder with a built in inclinometer and flux gate compass mounted on a conventional hard hat worn by construction workers. The laser rangefinder, flux gate compass, and inclinometer are all referenced to a common axis of alignment. The hard hat wearer looks toward the target and actuates a hand held trigger to take a measurement which is then fed to a hand held data recorder. This arrangement suffers from a similar limitation to that of the Criterion instrument in that accurate compass readings can only be taken when the apparatus is substantially level because of the floating core of the flux gate compass.

Therefore there is a need for a survey apparatus which permits the compass or angle sensor to be positioned independently of the laser based distance measuring instrument, yet retain the real time interconnection between the instrument and the compass and permit simultaneous inclination and azimuth readings at any inclination angle. There is also a need for a system configuration which allows the compass to be physically coupled to or decoupled from the laser based distance measuring apparatus to permit compass operation free from the effects of internally generated circulating electrical currents in the laser-based distance measuring device.

There is also a need for a surveying system that can be uniquely configured for the particular survey tasks at hand. For example, a very precise and expensive laser distance measuring device that has one centimeter resolution at 100 meters is clearly not needed for measurements involving distances more than 1000 meters. Similarly, measurements that do not need relative azimuth angle accuracies do not require the use of a measuring instrument which includes an angle encoder. Similarly, where exact GPS location determinations are not needed in addition to range and inclination, it should not be necessary to provide a GPS receiver. However, when the measuring requirements change, it is therefore desirable to provide the capability to rapidly and conveniently to change the configuration of compass, data logger, and/or laser-based distance measuring apparatus, without having to buy an entirely new system. In addition, there are many situations that may occur which do not require all of these features. Accordingly there is a need for a relatively low cost precision modular surveying measurement system that can be configured in a variety of ways depending on the current surveying requirements and one in which the configuration may be readily changed by combining, adding or removing modules.

SUMMARY OF THE INVENTION

The primary object of the invention is to provide a modular, compact, laser based surveying system incorporating separable modules which may be removably attached together and/or to a laser-based distance measuring module in various configurations and combinations depending on the particular surveying task to be accomplished.

Another object of the present invention is to provide a laser-based surveying system incorporating a laser-based distance measuring module with a compass in a configuration which permits the distance measuring module to be rotated in a vertical plane through 360 degrees of inclination.

It is another object of the invention to provide a hand held laser based surveying system in which the compass module may be remotely positioned from the laser distance measuring module so as to minimize distortion or corruption of the earth's magnetic field being sensed by the compass.

It is another object of the invention to provide a modular laser based surveying system which incorporates an angle encoder module in addition to a compass module which may be removably coupled to a laser-based distance and inclination measuring module.

Another object of the present invention is to provide a modular laser based surveying system which may be customized or configured uniquely to the surveying tasks required in the field at a particular time.

Another object of the present invention is to provide an inexpensive modular surveying system that can be tailored and configured in a plurality of different electrical configurations for specific measurement tasks.

A modular laser-based surveying system of the present invention basically comprises a laser-based distance measuring module and a separable compass module removably coupled to the distance measuring module. Each of these modules may be operated as stand alone units as each has its own power supply and display. The system further may comprise a separate angle encoder module adapted to be coupled to either the laser distance measuring module or the compass module.

The distance measuring module preferably includes, in a hand held compact housing, a laser transmitter, a laser receiver, an internal inclinometer, operator controls, signal processing circuitry for determining distance to a target based on time of flight of a laser light pulse to and from a target, and a display. The operator controls preferably includes a keypad for entry of operator commands to the signal processor and selection of various operating modes. This module also includes a data transfer connector for connecting output to a data logger or to another module for data processing.

The compass module includes a power supply, an electronic compass sensor, a signal processor for converting the compass sensor signal to bearing/azimuth data, a display for showing the user the bearing or azimuth reading, and for indication of selected operational modes, a functional keypad for entry of mode commands and compass calibration data by the user, and a data port for transferring azimuth data to another module or to a data logger or receiving data from an angle encoder. The compass module can also concatenate incoming data with its compass reading data for transmission to the data logger or other module.

The angle encoder module also has its own power supply and is preferably attached to either the compass module or to the laser-based distance measuring module and provides precise relative azimuth position data for calibrating the compass module or tracking angular position of the distance measuring module with respect to the compass module so as to continually provide accurate azimuth data. The angle encoder may be physically attached to the laser distance measuring module or the compass module and can concatenate its data with incoming data to yield a composite or combined data string for transmission to a data logger or other module.

The system of interchangeable modules also may include a data-logger module which is connectable to any of the other modules for storing measurement data for subsequent manipulation and/or mapping operations. In addition, the system may also include a GPS receiver module which is connectable to the data logger to provide precise location information that is integrated into the data logger for mapping functions. The GPS receiver module may be carried in a backpack arrangement connected via cable to the data logger.

The various modules may be connected together in a variety of ways. For example, the compass module may be physically and electrically connected directly to the laser-based distance measuring module with the latter providing output data to the data logger. Alternatively, the compass module may be remotely located in fixed relation to the distance measuring module and electrically connected separately to the data logger. Alternatively, an angle encoder may replace the compass module or may be added to the distance measuring module with the angle output being fed through the distance measuring module and/or compass module to a data logger. The angle encoder and/or compass may be remotely coupled to the distance measuring module in a fixed relation such as being mounted on front and rear side windows of an automobile. In addition, a global positioning system (GPS) receiver may be directly coupled either through the compass module or the distance measuring module to the data logger in order to precisely fix the measurer's position while taking measurements. Finally, each of the modules may be operated in a stand alone configuration and each has a concatenating capability so that each module may concatenate its data with that of other modules to which it is connected so that a composite data string is transmitted to the data logger or other data storage device.

Other objects, features and advantages of the present invention will become apparent from a reading of the following detailed description when taken in conjunction with the accompanying drawing wherein a particular embodiment of the invention is disclosed as an illustrative example.

DETAILED DESCRIPTION OF THE INVENTION

Figure 1:
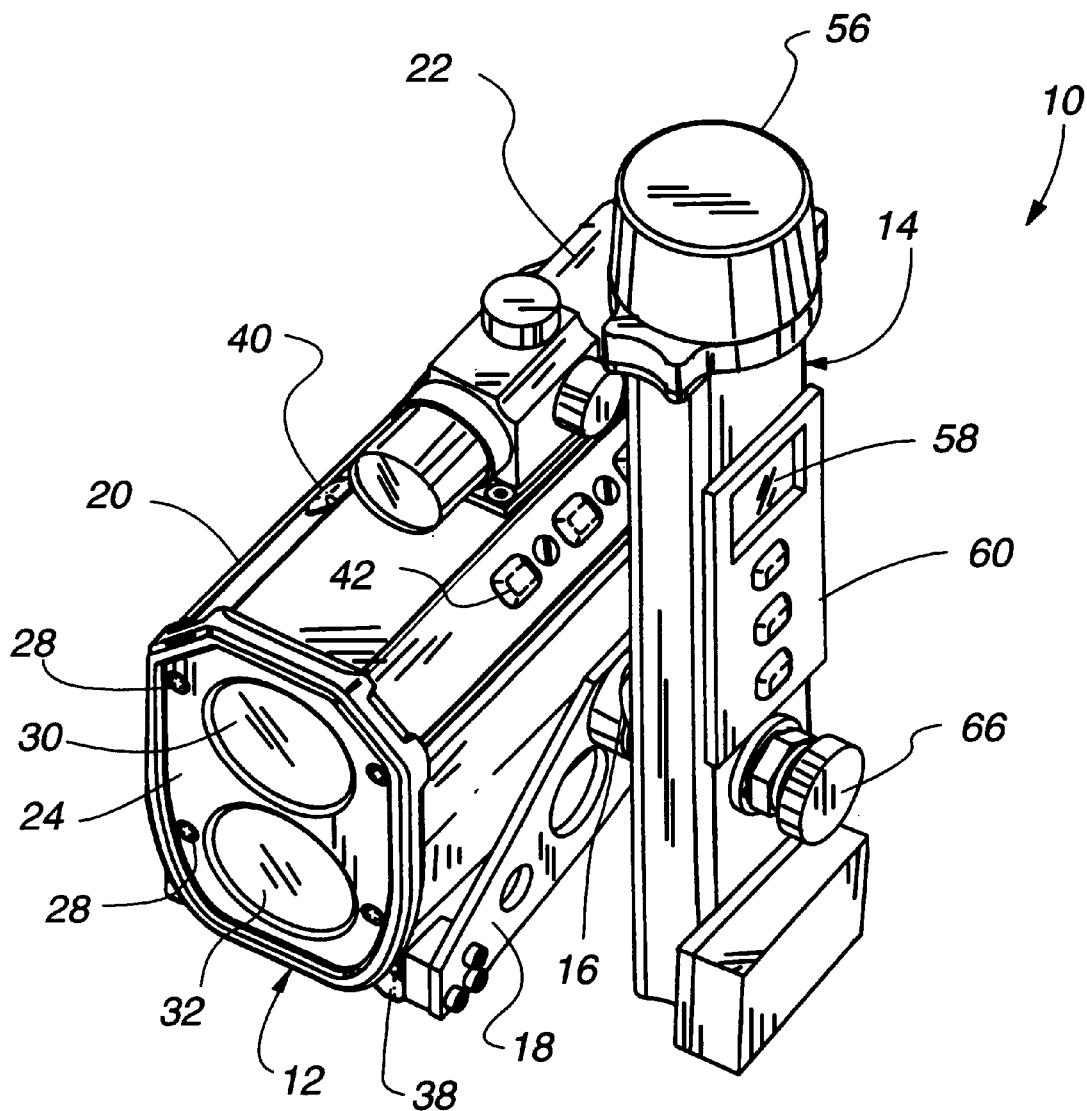
FIG. 1 is a perspective view of the modular surveying system apparatus in accordance with the present invention.
Figure 3:
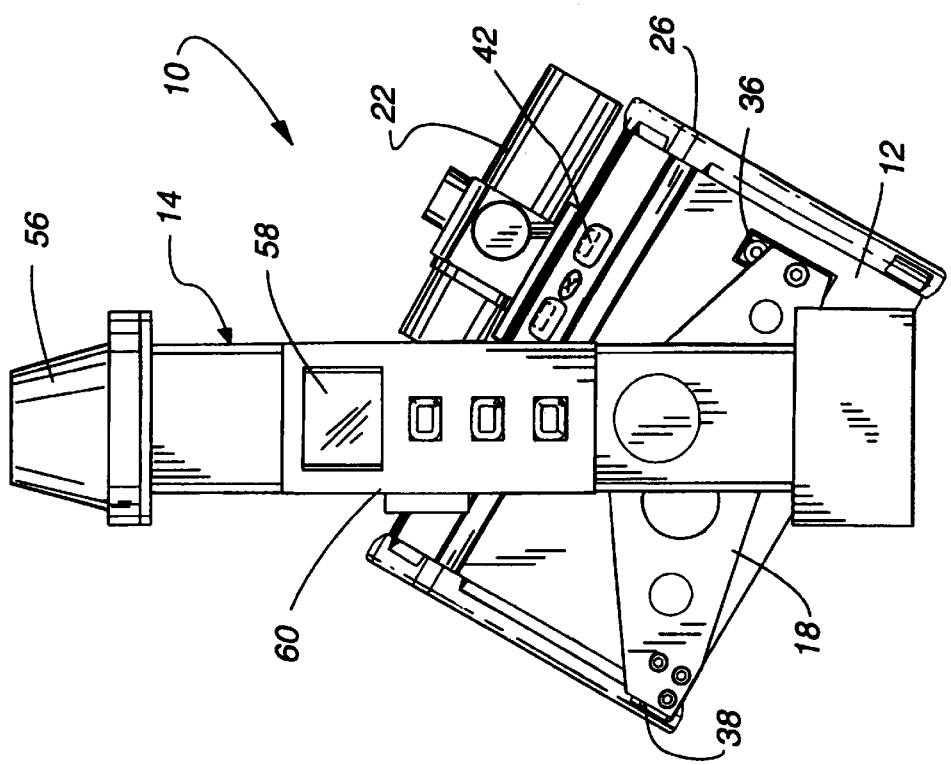
FIG. 3 is a left side view of the apparatus shown in FIG. 1.
Figure 2:
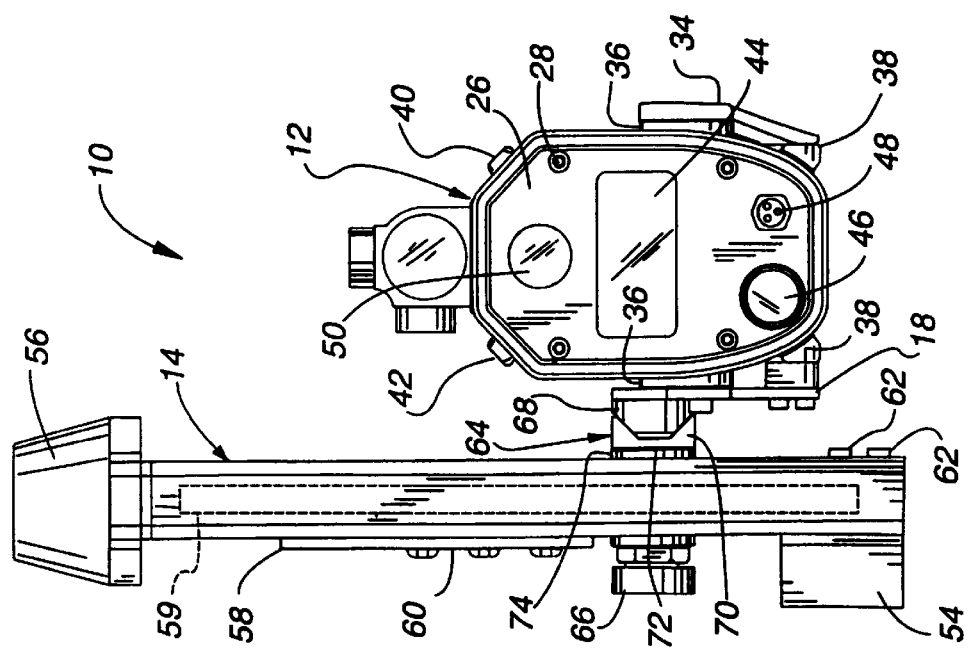
FIG. 2 is a rear end view of the apparatus shown in FIG. 1.

Referring now to the drawing, a perspective view of one preferred embodiment of the modular system of the present invention is shown in FIGS. 1 through 3. The system 10 in accordance with the present invention comprises a compact hand held laser range finding instrument module 12 and a separable compass module 14 which is fastened to the range finding instrument module 12 via a rotatable connection 16 mounted on a generally triangular bracket 18.

The laser module 12 has a compact housing 20 to which is mounted a sighting scope 22. The housing 20 of the preferred embodiment is a one piece extruded aluminum tubular housing closed by a front panel 24 (shown in FIG. 1) and a rear panel 26 (shown in FIG. 2) which are conventionally gasketed and fastened to the housing 20 via screws 28 to close and provide a moisture barrier for the housing 20.

The housing 20 encloses a laser transmitter which transmits a plurality of laser light pulses through a transmit lens 30, a laser receiver coupled through a receiving lens 32 for receiving reflected signals, a tilt sensor or inclinometer, and a microprocessor (all not shown) for processing reflected laser light signals and determining target ranges from the time of flight of the laser pulses to and from the target as is described in more detail in one or more of the above mentioned patents assigned to the assignee of the present invention.

The laser module 12 is sized to be held in one hand by a user. It is preferably provided with a hand strap 34 connected between a thumb rest 36 and a front mounting pad 38 bolted to the right side of the housing 20 as shown in FIG. 2. The top portion of the housing 20 has a three button control panel 40 mounted on the right side of the sighting scope 22 and another three button control panel 42 on the left side of the sighting scope 22. The control panels 40 and 42 are preferably identical to each other.

The control panel 40 is positioned so that when a user slips his or her hand under the strap 34 and rests the right thumb on the thumb rest 36 and holds the housing 20 upright so that that user can view a target through the scope 22 at eye level, the user's right fingers will comfortably reach the control buttons on the control panel 40.

The configuration shown in FIGS. 1 through 3 is for a right handed user. The rear most button on the control panel 40 is preferably used to fire the laser pulses. The other two buttons are used to advance and reverse through the various operational modes that are available to the user. The other control panel 42 on the opposite side of the scope 22 is termed the secondary control panel, being used for auxiliary functions such as power on/off and calibration operations. The primary panel 40 provides all the command functions necessary to operate the laser module 12. The configuration shown in FIGS. 1–3 may be reversed for a left handed user by simply reversing the position of the strap 34 and the bracket 18 to the other side of the housing 20 and reconfiguring the control panels 40 and 42 such that control panel 42 becomes the primary control panel via software.

The front panel 24 is a generally flat aluminum plate member which supports the transmitting and receiving lenses 30 and 32. The front panel 24 is fastened to the housing 20 with four screws 28. A gasket, not shown, extends around the perimeter of the front panel 24 and is sandwiched between the front panel 24 and the housing 20 to provide a watertight seal to the housing 20. The back panel is similarly fastened to the housing 20 with four screws 28 with a perimeter gasket to provide a watertight seal so that the module 12 is completely weatherproof.

Referring specifically to FIG. 2, an LCD display panel 44 is mounted to the back panel 26. This display panel 44 displays measurements taken by the module 12 as well as operational functions and mode indicators such as height, inclination, and units of measurement. When the laser module 12 is actuated to take a measurement, the display panel 44 displays a series of menus options containing instructions and selections for the operator, as well as displaying indications of measurements and determinations made by the laser module 12. Beneath the display panel 44 on the back panel 26 is a battery cap 46 threaded into corresponding threads in a bore (not shown) through the back panel 26 which circumscribes a cylindrical compartment (not shown) extending into the housing 20. The cylindrical compartment holds a power supply, such as a pair of AA batteries (not shown) mounted end to end, which provides power to the laser module 12. Adjacent the battery cap 46 on the back panel 26 is a port connector 48, such as preferably an RS232 serial output port, mounted through another bore through the back panel 26 through which data can be downloaded from the laser module 12 via an appropriate cable, to a remote device such as a data logger 76, a computer, or printer.

Also mounted in the back panel 26 above the display panel 44 is a diaphragm speaker 50. The speaker 50 is adapted to emit a predetermined tone from a plurality of predetermined tones, each of which corresponds to a predetermined frequency of vibration of the speaker voice coil. During operation of the laser module 12, the processor causes speaker 50 to emit a predetermined audible tone in response to certain events, such as target acquisition by the receiver circuitry. A different audible tone may be provided for different events so that the user can tell, without taking his eyes from the target and actually looking at the display panel 26, what mode of operation the module 12 is in or what measuring function is anticipated as being performed, such as direct distance, horizontal distance, or inclination measurement.

The laser module 12 weighs at most approximately 2 pounds and has preferred dimensions of approximately 6 inches in length, approximately 5 inches in height from the bottom of the housing 20 to the top of the sighting device 22, and approximately 2.5 inches in width measured across the front panel 24.

The compass module 14 weighs about one pound and includes a rigid elongated, extruded aluminum tubular housing 52 which supports a battery power supply container 54 preferably fastened to the side at the bottom end of the housing 52, an electronic compass such as a digital flux gate compass 56 mounted to the upper end of the housing 52, a compass signal processor circuit board 59 connected to the compass 56 mounted and enclosed within the housing 52, a display 58 on the side of the housing 52, and a control keypad 60 also mounted on the side of the housing 52. A set of two serial port connectors 62 connected to the processor circuit board 59 is also provided on the housing 52 for transfer of data signals to and from the compass module 14. A suitable compass is a model SE-25 flux gate sensor or a KVH-C100 compass manufactured by KVH Inc. of Rhode Island.

Optionally, the compass module 14 may also include its own internal tilt angle sensor (not shown) which can be used to ensure that the compass module 14 is correctly positioned to provide accurate azimuth information. The tilt angle sensor could be coupled to the processor circuit and to a speaker on the housing 52 to provide warning beeps if the compass module is held at other than the desired vertical position so that the floating ring core of the flux gate compass at the upper end of the housing 52 remains substantially in a horizontal plane. This feature may be particularly valuable when the compass module 14 and the laser module 12 are hand held rather than being joined together as shown in FIGS. 1–3.

Figure 9:
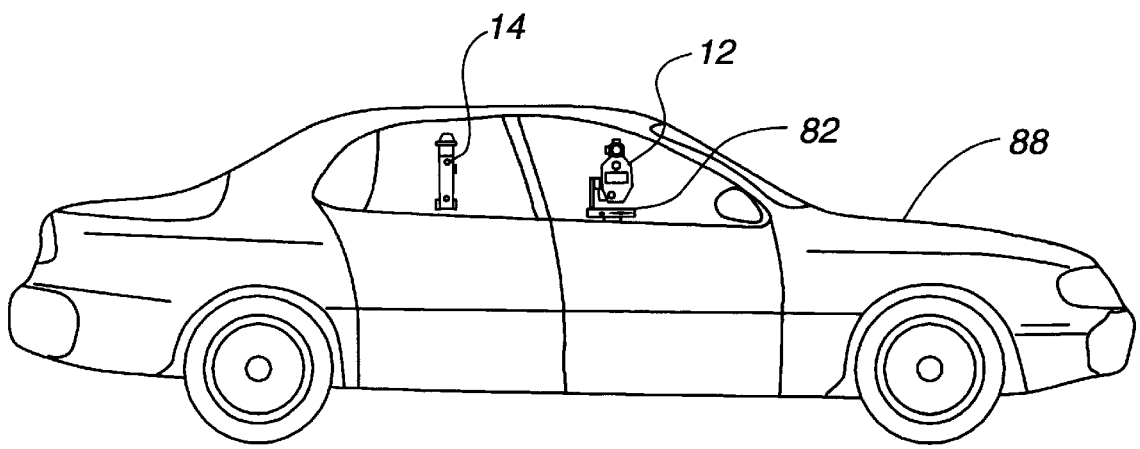
FIG. 9 illustrates how a configuration of the present invention as shown in FIG. 8 might be utilized in an automobile

The compass module 14 is designed to be removably attached to the laser module 12 via rotatable connection 16. This connection 16 preferably is a quick disconnect type adjustable joint assembly 64 which can be loosened and tightened via tension bolt knob 66. The joint assembly 64 extends transversely through the housing and perpendicular to the length of the housing 52 and fastens to the adapter bracket 18 mounted to the left side of the laser module 12. The compass module 14 may also be mounted to a tripod, monopod, or, with the aid of suction cups attached either directly to the joint assembly 64 or to a bracket similar to the bracket 18, the module 14 may be mounted to a vehicle window as is shown in FIG. 9.

However, as is shown in FIGS. 1–3, the compass module 14 is preferably fastened to the laser module 12 with a rotatable connection 16 so that the compass module 14 may be held vertical by the user while the laser module 12 is tilted or inclined at any angle, such as is shown in FIG. 3, and the assembly turned to any azimuth. Thus this mounting configuration orients the compass module in a fixed relation to the laser module in two dimensions. The compass module 14 then is calibrated via the keypad 60 to provide accurate bearing or azimuth readings for any measurement made with the laser module 12. This calibration procedure basically involves turning the system in a 360 degree horizontal circle and taking azimuth readings at a plurality of known angular positions around the circle, such as every 30 or 45 degrees.

The joint 64 comprises a double parallel tapered wedge block 68 bolted to the triangular bracket 18, a complementarily parallel tapered wedge seat block 70 which has a flat friction face 72 abutting against a friction washer 74 fixed to the housing 52. The thumb knob bolt 66 passes through the housing 52 and each of the components 72, 70, and threadably engages a threaded bore in the wedge block 68. The wedge blocks 68 and 70 are drawn together to accurately align the housing 52 parallel to the plane of the bracket 18 as the knob 66 is tightened. The friction face 72 and friction washer 74 permit the housing 52 to be rotated, or, in reality, held vertically stationary as the laser module 12 is rotated about the horizontal axis through the knob bolt 66.

The positioning of the compass 56 at the upper end of the housing 52, spaced from the circuit board 59 and as remote as possible from the battery power supply container 54 completely decouples the compass 56 from magnetic interferences caused by circulating currents in the internal circuitry in the housing 52 and magnetic interferences from the battery 54. In addition, the arrangement of the compass at the upper end positions the compass as remotely as possible from the battery power supply of the laser module 12 which is located at the bottom rear of the module 12. Accordingly, with the modular design of the present invention, magnetic distortions are minimized such that their effect on azimuth measurements is negligible. The decoupling of the compass from the laser module 12 is further advantageous in that the user can tilt the laser module through any conceivable inclination angle through a full 360 degrees and still get a viable compass reading when the compass module 14 is maintained in a substantially vertical orientation and thus the floating core of the flux gate compass 56 is maintained horizontal for maximum accuracy. It is to be understood that other compass types may be utilized in place of a flux gate compass as above described. An optical compass, variable reluctance or magneto-resistive sensor which uses fixed magnetic sensors in a three dimensional configuration may be used.

The configuration of the laser module 12 and the compass module 14 shown in FIGS. 1–3 permits to user to easily support the assembled system 10 with his/her left hand holding the housing 52 in an upright, vertical position while simultaneously tilting and operating the laser module 12 with the right hand.

The modules 12 and 14 may also be separated from the bracket 18 and hand held during use. However, in this configuration, azimuth readings are less accurate as the user must manually point or orient the compass module 14 in the aiming direction of the laser module 12 as the measurement is made.

Figure 4:
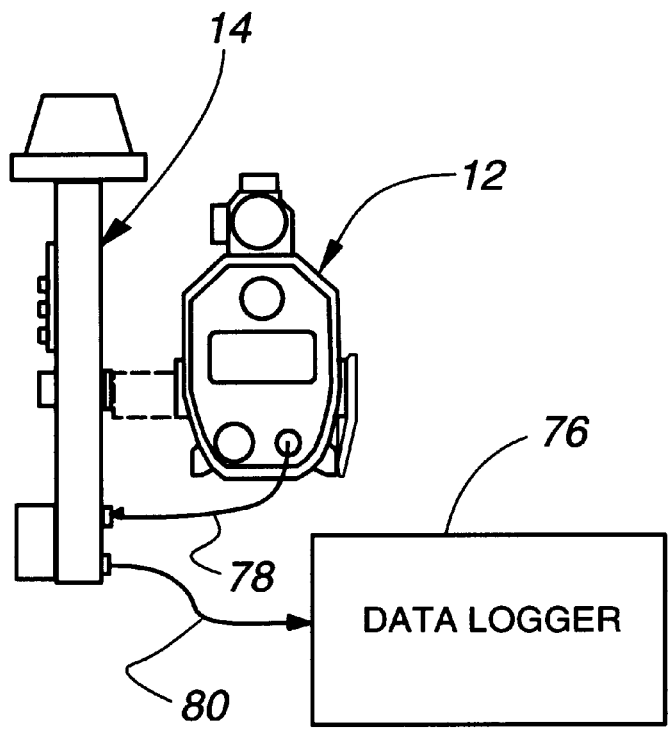
FIG. 4 is a simplified view of the apparatus shown in FIG. 2 illustrating one electrical configuration.

Referring now to FIG. 4 through 9, various configurations of the system 10 are shown. FIG. 4 includes a data logger 76 which is connected to the laser module 12 via cables 78 and 80 through the compass module 14. The firing of the laser pulses in the laser module 12 and transmission of data from the laser module through cable 78 to the data logger 76 via the compass module 14 in a pass through manner triggers transmission of an azimuth reading from the compass module 14 to the data logger 76. Within the compass module 14 the data from the laser module is preferably concatenated into a composite data string which is then fed to the data logger 76.

In operation, the laser unit 12 produces a range and inclination or range signal alone and downloads this data either upon manual initiation or automatically via cable 78 to the compass module 14. The compass module processor 59 preferably combines this downloaded data from the laser module 12 with azimuth data to produce a combined data string that the data logger 76 can use to generate three dimensional positioning of the target. Another important feature of the present invention is that each of the modules may be operated completely independently of the other in standalone mode. Thus, for example, the compass module 14 can be used separately to provide bearing readings and the laser module 12 can be used alone to provide distance, inclination, target height, and target width measurements, readings or data.

Figure 5:
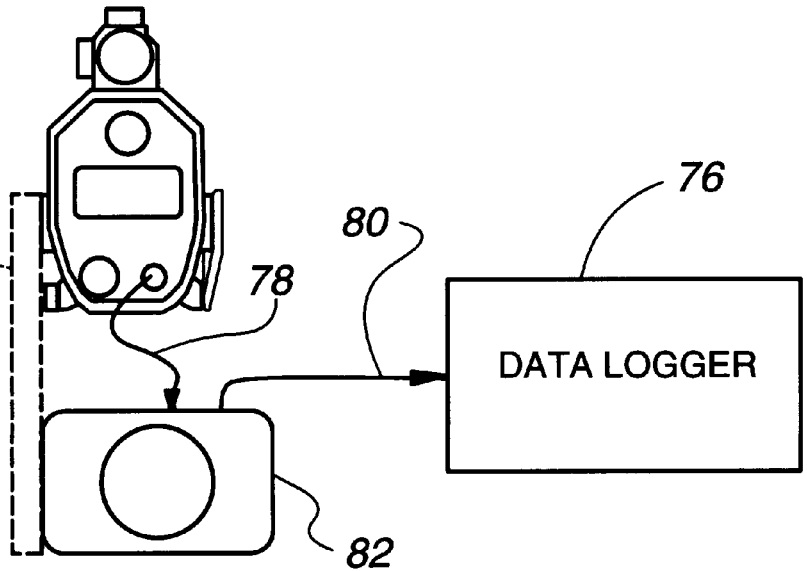
FIG. 5 is a simplified view as in FIG. 4 with the compass module replaced by an angle encoder module.

In FIG. 5, an angle encoder module 82 is shown fastened to the laser module 12 in lieu of the compass module 14. A suitable angle encoder module is a Model RCH20D-5000 manufactured by Renco Encoders, Inc. of Goleta, Calif. The angle encoder 82 may also be calibrated to provide azimuth readings or data referenced to a fixed point or reference angle programmed into the angle encoder 82. The angle encoder 82 may be any of a number of angle encoders available today and is preferably connected to the data logger 76 in the same way as is shown in FIG. 4, that is, with the laser module connected to the angle encoder 82 via cable 78 and the encoder 82 connected to the data logger 76 via cable 80 so that a laser measurement data transmission through port 48 triggers an angle data transmission from the encoder 82 to the data logger 76. Again, within the angle encoder 82 the data from the encoder is preferably concatenated with the laser module 12 and/or compass module 14 into a composite data string which is then fed to the data logger 76.

Figure 6:
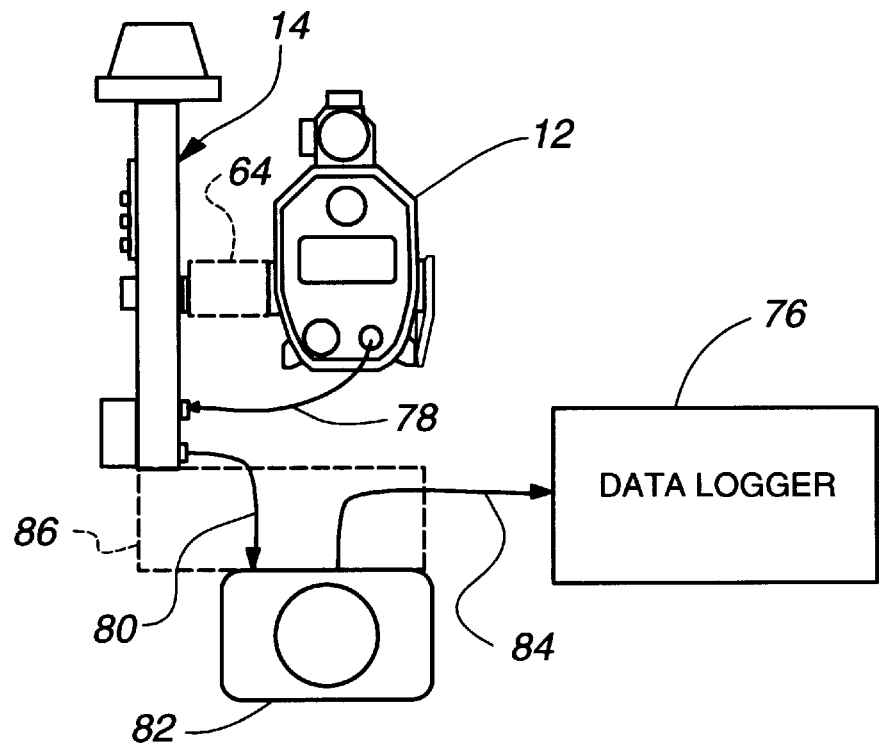
FIG. 6 is a simplified view as in FIG. 4 with addition of an angle encoder module connected to the compass module.

In FIG. 6, the angle encoder module 82 is arranged to provide an increased precision azimuth signal to the data logger 76. The laser module 12 is connected via cable 78 to compass module 14, the compass module 14 is connected to the angle encoder module 82 via cable 80, and the angle encoder is connected to the data logger 76 via cable 84. The laser measurement transmission via port 62 on the laser module is again a pass through signal to the data logger 76.

The laser measurement transmission triggers an azimuth signal transmission from the compass module 14 via cable 80 to the angle encoder 82. Either the compass module transmission or the laser measurement signal transmission may be used to trigger the angle encoder 82 to produce an angle signal transmission to the data logger 76. The azimuth signal and angle signal may be compared in the data logger to provide improved accuracy of azimuth information recorded for later use in the data logger 76 for mapping, etc.

Figure 7:
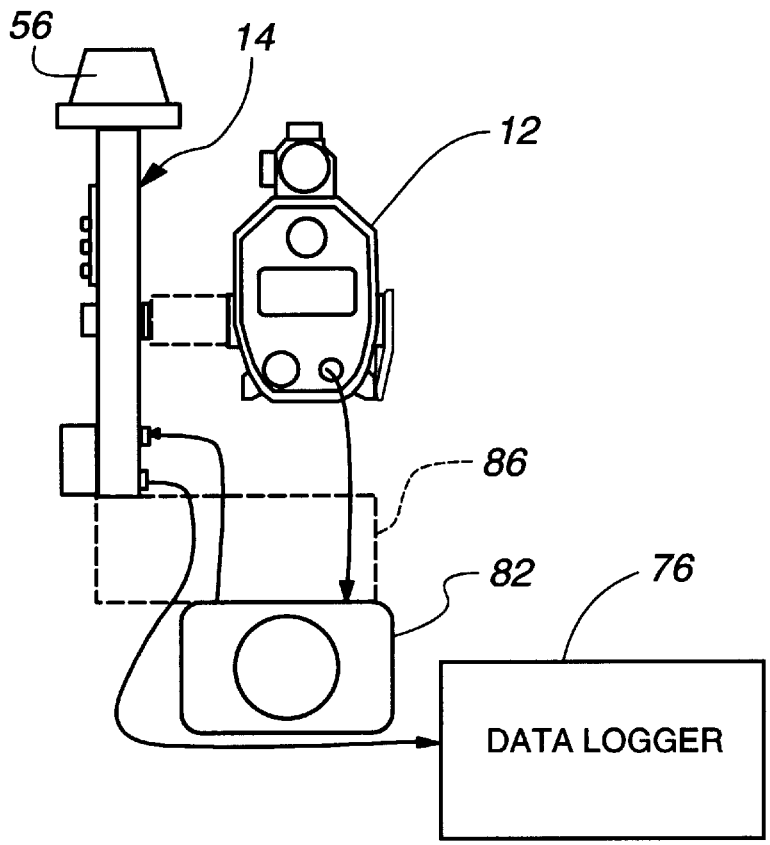
FIG. 7 is a simplified view as in FIG. 6 showing an alternative electrical configuration.

As is shown in FIG. 7, the laser module 12 may be connected alternatively through the angle encoder module 82 first and then through the compass module 14 to the data logger 76. In this configuration, the angle encoder signal triggered by the laser measurement transmission could be used to trigger an azimuth signal transmission to the data logger 76.

Figure 8:
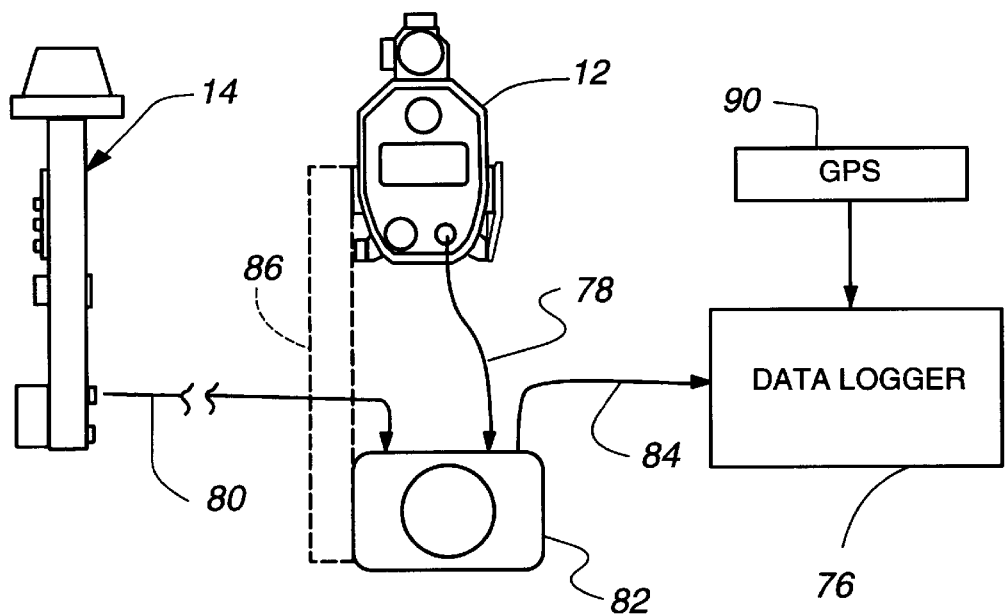
FIG. 8 is a simplified view of the system in accordance with the present invention incorporating an angle encoder with the compass module remote from the distance measuring module and coupled to a GPS receiver.

The addition of the angle encoder module 82 to the system of the laser module 12 and the compass module 14 increases the possibilities of configurations of the modules in the system 10. Examples are shown in FIGS. 8 and 9. In FIG. 8, the compass module 14 may be physically separated from the other modules. The compass module 14 may be mounted on a monopod or tripod and spaced from the laser module 12. The laser module 12 is fastened to the angle encoder via a bracket 86. In this configuration, the angle encoder output signal provides a relative angle signal of the laser measurement while the compass module provides a reference signal for the angle encoder 82. Thus, in this configuration, the compass module signal feeds into the angle encoder module 82 while the laser module measurement signal passes through the angle encoder module to the data logger 76 and triggers the angle encoder module 82 to produce an azimuth signal substantially concurrently with the laser module measurement signal transmission to the data logger 76. In addition, a GPS receiver 90 may be connected to the data logger 76 to provide precise location coordinate data of the user's position.

The configuration in FIG. 8 is particularly suited for installation in a vehicle 88 such as the automobile shown in FIG. 9. In this configuration, the compass module 14 is suction mounted on the rear window of the vehicle 88. The laser module and angle encoder module 82 are mounted either by suction cups or be a flange stuck in the window slot of the front window. The laser module 12 is preferably mounted to a rotatable portion of the angle encoder 82. Since the angle encoder module 82 and the compass module 14 are fixed in relation to each other, they can be calibrated together to provide a convenient, mobile configuration that can be easily calibrated for use without the user having to alight from the vehicle 88. In addition, and perhaps more importantly, the compass module 14 is fixed remotely from the angle encoder 82 and therefore the compass module does not rotate with the angle encoder as the laser module is rotated. This is important in that motion of the compass relative to the vehicle body completely invalidates the compass calibration so that you get very inaccurate results. Since the compass module is rigidly fixed to the vehicle in this configuration, you can turn the vehicle in a circle and calibrate the compass to that vehicle. This removes any error and the user utilizes the angle encoder position referenced to the compass to provide absolute azimuth to the target at all positions of the angle encoder module 82. In short, this configuration allows the user to obtain accurate results throughout the visible range from the vehicle because the compass module 14 has not moved. Although not shown in FIG. 9, the modules 12, 14, 82 and the data logger 76 would preferably be connected together as in FIG. 8.

Referring back now to FIGS. 1–3, the bracket 18 is preferably a flat triangular sheet metal member which has one corner fastened to the lower front hand strap mounting pad 38, an opposite corner fastened to the thumb rest 36, and its apex fastened via joint assembly 64 to the compass module 14. It is readily apparent that other shapes of the bracket 18 may be utilized. For example, an "L" shaped bracket may be substituted or the bracket 18 fitted with a bottom horizontal flange if the modules are to be mounted to a conventional tripod. An inverted U shaped bracket having a downwardly open slot to receive an upper portion of a partially lowered vehicle window glass could also be used.

The display 58 on the compass module 14 could be arranged other than as shown. Also, the control keypads 60 and 40 and 42 could have other button arrangements than the three button arrangement shown. The battery container 54 could be internally positioned within housing 52 or replaced by a remotely located power supply, such as a belt pack. Other modules such as a GPS receiver 90 could be directly coupled to the data logger 76 to any of the configurations shown in FIGS. 4–9 to provide additional coordinate data input for subsequent mapping operations.

Further, the particular laser module utilized in any system configuration shown in the Figures may be selected from short range, long range or extended range module models, depending on the measurement tasks being anticipated. For example, with this modular design of the present invention, one may be surveying a building and lot arrangement. In this case, a laser module with short range, say 10–200 meters would be appropriate. On the other hand, if one is surveying open country, a laser module having a range of up to 2000 meters may be more appropriate. In either case, the addition of a compass module and/or an angle encoder module, GPS receiver, data logger or laptop computer to the system enables the user to optimize the equipment configuration being used for the particular survey situation. Alternatively, if the user is only going to measure distances on a particular day, such as would be the case in stringing telephone poles, the user need only utilize the laser module alone. Suitable laser rangefinder modules for use in the modular system of the present invention are currently available from Laser Technology, Incorporated. These modules include the Impulse 100, 200, XL, and LR models and the SharpShot 2000 model, each of which may be advantageously utilized in the present invention. Thus the modular system of the present invention allows the user to mix and match component modules as may best fit the situation at hand.

Thus the present invention may be practiced otherwise than as specifically described above. Many changes, alternatives, variations, and equivalents to the various structures shown and described will be apparent to one skilled in the art. Accordingly, the present invention is not intended to be limited to the particular embodiments illustrated but is intended to cover all such alternatives, modifications, and equivalents as may be included within the spirit and broad scope of the invention as defined by the following claims. All patents, patent applications, and printed publications referred to herein are hereby incorporated by reference in their entirety.

What is claimed is:

1. A modular surveying system comprising:
    a laser based distance measuring module having a hollow housing containing a transmitter for transmitting laser pulses toward a target, a receiver for receiving reflected laser pulses from said target, a processor connected to said transmitter and receiver for determining from said transmitted and reflected pulses a distance to said target, a display device for viewing said distance, and a power supply connected to said transmitter, said receiver, said processor and to said display device; and a separable angle encoder module having an angle encoder module housing adapted to be attached to said laser based distance measuring module, said angle encoder module sensing an angle between a reference angle and an angular position of said laser module and producing an azimuth signal for said laser module, wherein said laser based distance measuring module is tiltable through up to a 360 degree vertical arc while said angle encoder module remains in a substantially constant position fastened to said laser module.

2. The system according to claim 1 wherein said laser module transmits a distance data signal to a data storage device through said angle encoder module, said angle encoder module concatenating said azimuth with said distance data to form a composite data string transmitted to said data storage device.

3. The system according to claim 2 wherein said data storage device comprises a data logger.

4. The system according to claim 3 wherein said laser based distance measuring module includes a tilt sensor measuring tilt of said module from a horizontal plane.

5. A method of taking an azimuth and distance measurement comprising the steps of:

providing a hand held laser-based distance measuring module capable of determining a distance from the laser module to a target;

electrically connecting said laser module to a separate compass module spaced from said hand held laser-based distance measuring module;

holding said compass module in a position effective to obtain an accurate azimuth reading toward said target;

tilting said laser module toward said target while holding said compass module in said effective position;

triggering said laser module to obtain said distance measurement and said azimuth measurement.

6. The method according to claim 5 further comprising fastening said compass module to said laser module to fix said modules together in a spaced horizontal relationship permitting vertical relative rotational movement between said modules through an arc of 360 degrees.

7. The method according to claim 6 further comprising the steps of:

rotating said modules to a plurality of predetermined angular positions about a vertical axis covering at least a full 360 degree horizontal rotation; and measuring an azimuth at each of said predetermined positions;

entering each of said predetermined angular positions into said compass module to calibrate said compass module.

8. A method of taking an azimuth and distance measurement comprising the steps of:

providing a hand held laser-based distance measuring module capable of determining a distance from the laser module to a target;

electrically connecting said laser module to a separate compass module;

mounting said compass module on a vehicle;

mounting said laser module at a different location on said vehicle such that said module may be tilted about a horizontal axis;

aligning said compass module toward said target;

tilting said laser module toward said target; and triggering said laser module to obtain said distance measurement and a compass azimuth reading to said target.

9. The method according to claim 8 further comprising the steps of:

mounting an angle encoder to said laser module which permits said laser module to be horizontally rotated about a vertical axis through said laser module mounted on said vehicle;

electrically connecting said encoder to said compass module to provide laser module azimuth information to said compass module;

aiming said laser module at said target independent of said compass module orientation;

providing relative laser module azimuth information from said encoder to said compass module when said laser module is fired at said target;

determining target azimuth from said compass azimuth and laser module azimuth information.

10. The method according to claim 9 further comprising calibrating said compass module to said vehicle by driving said vehicle in a circle and taking compass azimuth readings at a plurality of positions.

11. The method according to claim 8 further comprising moving said vehicle to orient said compass module at a plurality of predetermined angular positions about a vertical axis covering at least a full 360 degree horizontal rotation about said axis; and measuring an azimuth at each of said predetermined positions;

entering each of said predetermined angular positions into said compass module to calibrate said compass module.

* * * * *